March 3, 1964     L. BLANCHET     3,123,425
REMOVABLE TERMINAL CARRIER BAR
Filed Oct. 3, 1960
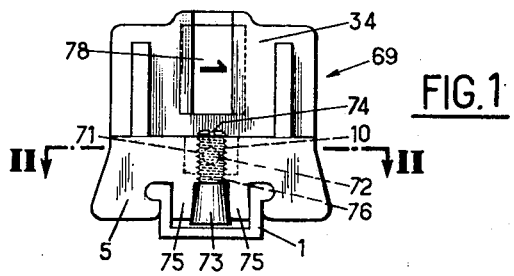
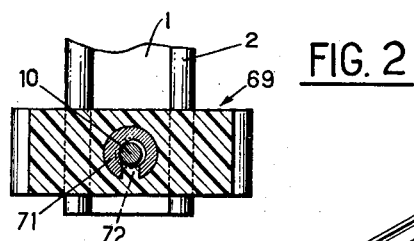
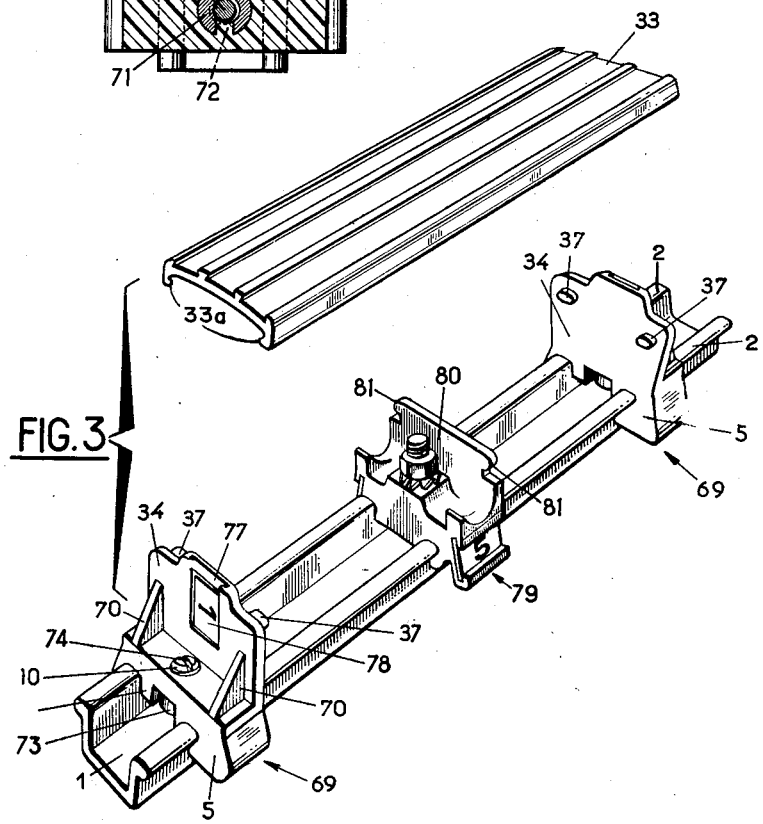
INVENTOR
Lucien Blanchet
ATTORNEYS United States Patent Office 3,123,425
Patented Mar. 3, 1964

1

3,123,425
REMOVABLE TERMINAL CARRIER BAR
Lucien Blanchet, 35 Rue du Cinq Mars, Colombes, France
Filed Oct. 3, 1960, Ser. No. 59,967
Claims priority, application France Oct. 7, 1959
7 Claims. (Cl. 339—198)

In the applicant's copending U.S. application No. 777,328, filed December 1, 1958, now U.S. Patent No. 2,983,897, there is described a terminal carrier bar assembly consisting of a number of components removably aligned on a track, the assembly having at each end, first a plate with lugs for the purpose of attaching the end cover, and then an end clamp which can be locked to the track, holding it in place.

This invention concerns a variant in the construction of these components and end parts, characterized mainly by the fact that the end plates, while still providing lugs for attaching the cover members, are now irremovable and are an integral part of a single unit. Furthermore, the end clamps are also made of a molding plastic material and formed into said single unit with the end plates.

A practical application, inherent in the invention, consists in locking the end clamp by means of a conical head screw which causes the expansion of that part of the end clamp between the rails of the track, when the screw is screwed into a nut set in the moulded material. This screw is locked both by friction on the cone and by force exerted by the threads on at least one of the sides of the plastic material, in which the nut is embedded with its interior area in contact with the remainder of the moulded mass, through a hole drilled perpendicularly to the axis of the unit and filled with plastic material during the moulding operation. Finally, a label-holder can be included in the unitary moulded piece, for the identification of the bar.

In order to make clear the objectives of this invention, a descriptive explanation is now given, without limiting the scope of its conception, and illustrated by the attached drawing, whereon:

FIGURE 1 represents an elevation of the unitary piece which fulfills the function of both the end clamp and end plate;

FIGURE 2 is a cross-section taken along the line II—II of FIGURE 1;

FIGURE 3 represents, in perspective, the track with its two end parts and its cover ready to be put in place, only one of the intermediate parts being shown.

Referring to FIGS. 1–3, rigid channel member 1 serves as an elongated support track, having at its upper part two flared-out portions 2 forming a pair of guide rails which act as integral snap-attaching means with the depending projections on end clamp 69 and terminal support 79 as in Patent No. 2,983,897 above referred to. The end clamp 69 comprises a thin plate 34 perpendicular to the track and carries the lugs 37 necessary for attaching the cover 33. Part 69 comprises also a base 5 which snaps over the rails of the track 1. The two parts 34 and 5 which form the unitary end clamp 69 present an integral unit to be reinforced, if need be, by flanges 70 during the actual moulding operation.

In accordance with the method of construction preferred by the invention part 5 of end clamp 69 holds an embedded nut 71, which is milled and has a hole 72 drilled perpendicular to its axis, which, when filled with plastic material, produces a locking action thus preventing a rotating or dislocating motion within the plastic embedment. A locking screw 10, having at its lower end a head 73 which is conical in shape, with slightly slanted sides, and, in the upper part a slot 74, is screwed into the nut. This screw 10 (and the nut 71) will suitably be left threaded so that it can be screwed into the nut 71 by turning it from the top of part 69 in the normal direction. The screwing motion produces a lifting action on the cone, which as it inserts itself between the two prismatic flanges 75 causes a distortion of the plastic material and produces the locking of end clamp 69 against the track 1 at any point of its surface.

The locking of the screw, to preclude its loosening through vibration, is primarily assured through friction on the flanges 75 by the conical head 73, the surface of which could have grooves. Moreover, additional locking force is exercised on the threads of the screw 10 by the plastic material forced through the hole 72 in the nut 71, and filling part of its threading. Finally, the embedding material for the nut 71 may be drilled either above or below the nut 71, as shown at 76, with a smooth sided hole of a sufficiently small diameter to provide positive locking of the screw 10.

Additionally, in conformity with the invention, end clamp 69 may include, in part 34 for instance, a label-holder 77 for the insertion of a label 78 giving a complete identification of the terminal carrier bar.

Then again, intermediate plates can be advantageously built in one single unit with a sliding terminal support thus obtaining a unitary terminal support and partition shown as 79 on FIGURE 3. This part 79 comprises a vertical plate 80 forming a separation between one terminal and the next one, when both are placed in the same direction. Moreover, plate 80 has two cut-outs 81 defining projections in the form of lugs.

The present invention comprises a single unit, shown as 80, which avoids the use of separate covers, these latter being held in place by the lugs 81 as well as by the end lugs 37, which cooperate with the tangs 33a on the cover 33. Thus, it is observed that the attachment of the cover 33 is not only more effective when it covers several terminal supports, but that, without inconvenience in length, it can cover a greater number of terminal supports so that these covers are securely held in place along their entire length without risk of flection or torsion.

It is clearly understood that the method of construction, described above, is not limitative in character, and can be subjected to desirable modifications without going beyond the intent of the invention.

What I claim is:

1. A terminal-carrier bar for the connection of electrical cables comprising in combination an elongated support member made of rigid material and comprising a pair of parallel rails a plurality of terminal supports extending transversely thereacross, an electrical terminal on each terminal support, end clamps also extending transversely across said elongated support member on opposite sides of said at least one terminal support, said rails constituting snap attaching means on said elongated support member, and snap attaching means on said terminal supports and said end clamps which interfit with those on said elongated support member, said terminal supports and end clamps being formed of a resilient insulating material and provided with integral insulating plates which extend transversely away from said elongated support member, and cover means of resilient insulating material extending over said terminals, said plates and cover means being provided with interfitting snap attaching means for attaching them to each other, to form an individual compartment for each terminal shielding it from the other terminals.

2. A terminal carrier bar as claimed in claim 1 in which said end clamp comprises a main body adapted to extend transversely across said support member, and two pair of depending projections, each pair being formed to snap over one of said rails, and being spaced from the other pair, a nut embedded in said main body between said pairs of projections, and a mating screw seated in said nut, said screw having a conical head extending into the space between said projections, said head having a maximum diameter toward the end away from said nut which is greater than the width of said space, so that as said screw is screwed into said nut the sides of said head press progressively against the sides of said projections adjacent said space, thus squeezing said projections against said rails.

3. An end clamp for holding terminal carriers in position on an elongated support comprising a pair of parallel rails, said clamp comprising a main body adapted to extend transversely across said support, and two pair of depending projections, each pair being formed to snap over one of said rails, and being spaced from the other pair, a nut embedded in said main body between said pairs of projections, and a mating screw seated in said nut, said screw having a conical head extending into the space between said projections, said head having a maximum diameter toward the end away from said nut which is greater than the width of said space, so that as said screw is screwed into said nut the sides of said head press progressively against the sides of said projections adjacent said space, thus squeezing said projections against said rails.

4. An end clamp as claimed in claim 3 in which said nut is provided with a transverse orifice, said orifice being filled with the insulating material forming said clamp body.

5. An end clamp according to claim 3 in which said screw extends through a screw-hole provided in the material of said clamping member close below said embedded nut, the diameter of said screw hole being substantially equal to the root diameter of the thread of said screw.

6. An end clamp for holding terminal carriers in position on an elongated support comprising a pair of parallel rails, said clamp comprising a main body adapted to extend transversely across said support, and at least two depending projections shaped to fit between said rails, a threaded aperture in said main body between said projections, and a mating screw seated in said threaded aperture, said screw having a conical head extending into the space between said projections, said head having a maximum diameter toward the end away from said threaded aperture which is greater than the width of said space, so that as said screw is screwed into said threaded aperture the sides of said head press progressively against the sides of said projections adjacent said space, thus squeezing said projections against said rails.

7. An end clamp as claimed in claim 6 in which said screw is slotted at the end opposite said head, and both said screw and said threaded aperture have a left hand thread.

References Cited in the file of this patent
UNITED STATES PATENTS

| | | |
|---|---|---|
| 1,926,927 | Woertz | Sept. 12, 1933 |
| 1,936,963 | Dutzmann | Nov. 28, 1933 |
| 2,011,861 | Knumann | Aug. 20, 1935 |
| 2,780,791 | Morschel | Feb. 5, 1957 |
| 2,830,281 | Robb | Apr. 8, 1958 |
| 2,983,897 | Blanchet | May 9, 1961 |
| 2,990,534 | Nielsen | June 27, 1961 |
| 3,002,177 | Bundy | Sept. 26, 1961 |
| 3,018,464 | Mrenna et al. | Jan. 23, 1962 |

FOREIGN PATENTS

| | | |
|---|---|---|
| 716,623 | Germany | Jan. 24, 1942 |